United States Patent [19]

Erlam

[11] Patent Number: 4,656,801
[45] Date of Patent: Apr. 14, 1987

[54] FRAME STRUCTURES

[75] Inventor: David P. Erlam, Winchester, England

[73] Assignee: Rittal-Werk Rudolf LOH GmbH & CO KG, Fed. Rep. of Germany

[21] Appl. No.: 792,065

[22] Filed: Oct. 28, 1985

[30] Foreign Application Priority Data

Nov. 1, 1984 [GB] United Kingdom ............... 8427710

[51] Int. Cl.⁴ .......................... E04C 2/38; F16B 12/50
[52] U.S. Cl. ...................................... 52/280; 52/656; 52/475; 403/171
[58] Field of Search ............... 52/475, 656, 816, 818, 52/663, 665, 280; 403/217, 231, 403, 169–173, 176

[56] References Cited

U.S. PATENT DOCUMENTS

| | | | |
|---|---|---|---|
| 1,665,816 | 4/1928 | Mautner | 403/217 |
| 2,049,925 | 8/1936 | Rafter | 403/403 |
| 2,351,127 | 6/1944 | Hodson | 402/231 |
| 2,703,635 | 3/1955 | Carlson | 403/231 |

OTHER PUBLICATIONS

United Kingdom Application GB 2,067,639 A, published 30 Jul. 1981, 3 pages of dwgs., 3 pages of spec.
United Kingdom Application GB 2,112,492 A, published 20 Jul. 1983, 3 pages of dwgs., 7 pages of spec.

Primary Examiner—James L. Ridgill, Jr.
Attorney, Agent, or Firm—Renner, Otto, Boisselle & Lyon

[57] ABSTRACT

A three way joint for a frame structure comprises a location piece secured to one end of a first transverse member and having two spaced protrusions extending axially of the first transverse member and a screw threaded nut (not shown); a second transverse member to engage over the location piece and having apertures to receive the protrusions and a further aperture and an upright frame member having apertures therein to receive the protrusions; and a further aperture to receive a bolt, the bolt passing through the apertures and engaging in the nut to clamp the three members together. A reinforcing member may be included.

13 Claims, 10 Drawing Figures

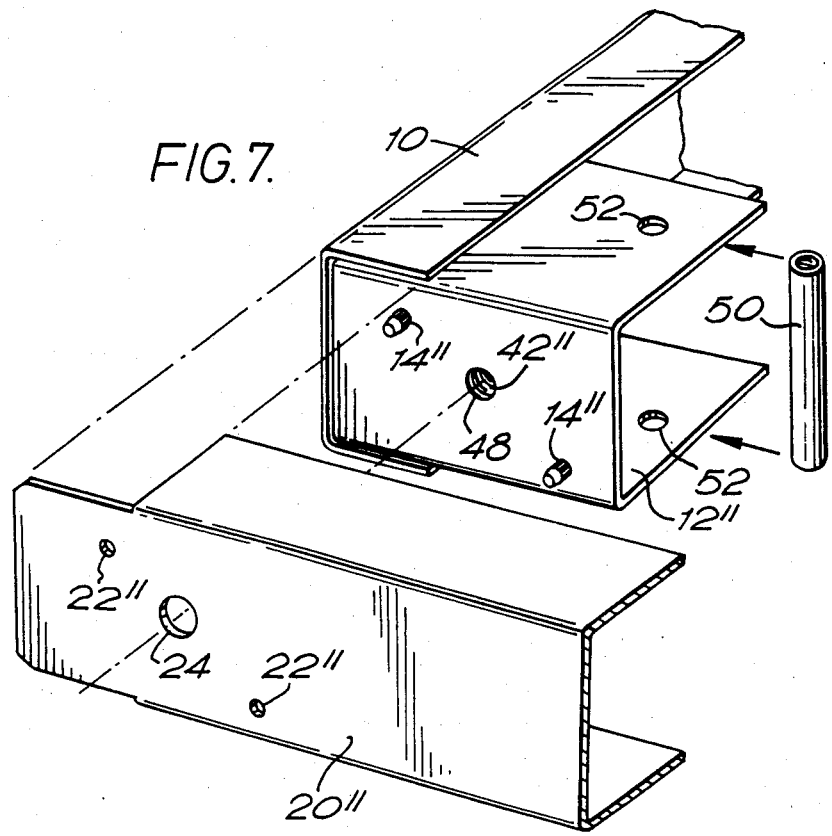
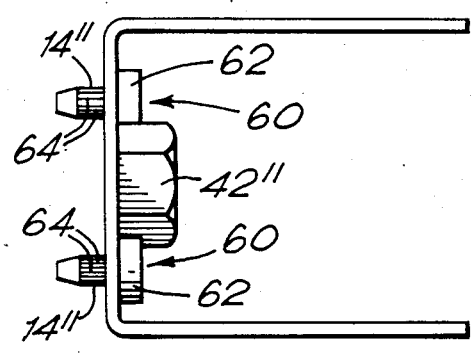

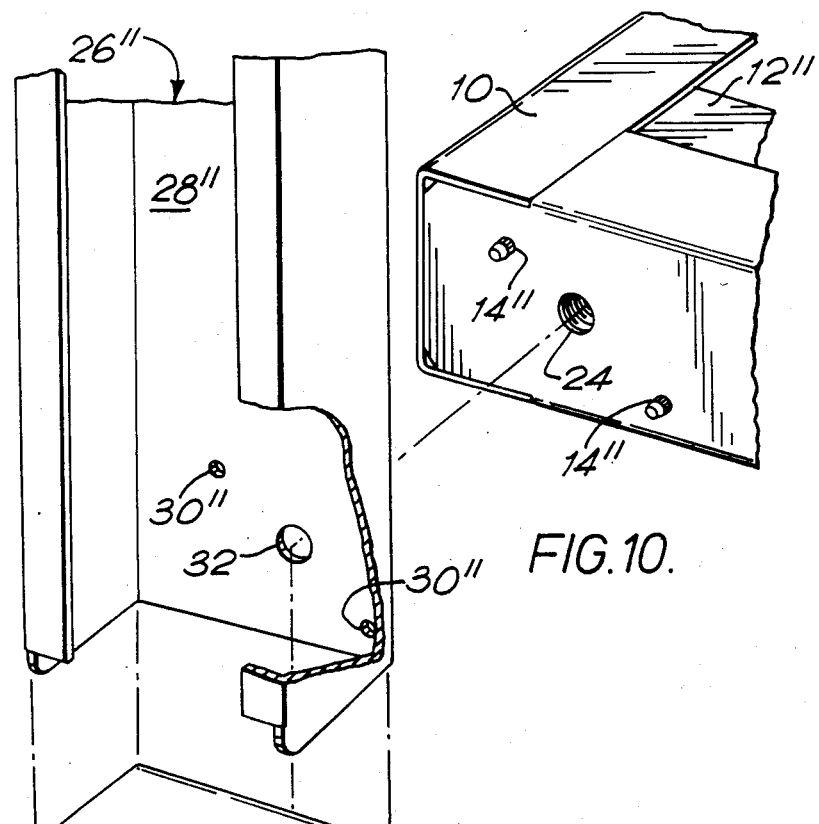
FIG. 10.
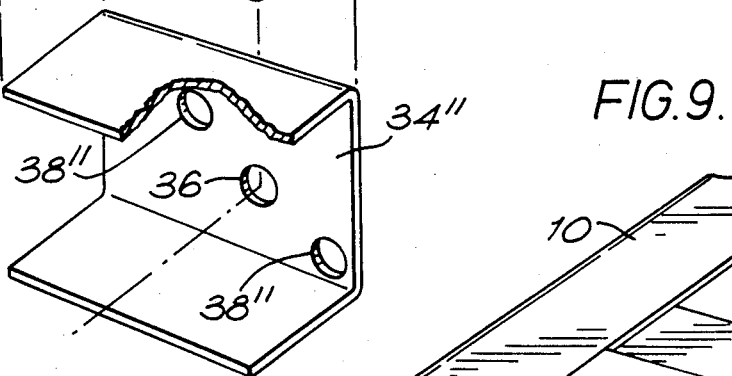
FIG. 9.
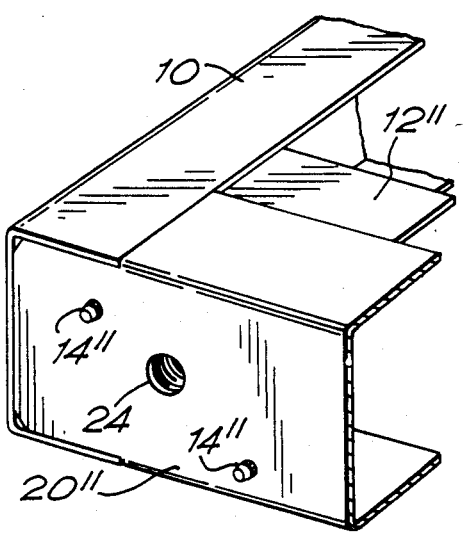

FRAME STRUCTURES

This invention relates to frame structures.

It is of course known for a frame structure to comprise upright and transverse frame members that are joined together to form the structure. Such frame structures may, for example, be used to form cabinets for housing electrical or other equipment. In that application, and also in other applications, the parts for forming the frame structure may be supplied in kit form to the user. The user may have little or no mechanical workshop facilities, or at least might not wish to use these facilities for erecting a frame structure. Consequently, it is important that the frame structure be so designed that it can be erected with a minimum of difficulty by largely unskilled personnel.

According to the present invention there is provided a frame structure comprising upright and transverse frame members that are joined together in such a manner that, at least at one position on the structure:

a location piece is fitted to one end of a first transverse frame member, the location piece having at least two spaced protrusions extending therefrom substantially axially of the first transverse frame member, and the location piece also having a first threaded securement element;

a second transverse frame member has at least two spaced openings fitted over the protrusions to locate the second transverse frame member with respect to the first transverse frame member, the second transverse frame member also having an aperture which, when the openings are fitted over the protrusions, is aligned with the first threaded securement element;

an upright frame member has at least two spaced openings fitted over the protrusions to locate the upright frame member with respect to the first and second transverse frame members, the upright member also having an aperture which, when the openings are fitted over the protrusions, is aligned with the aperture of the second transverse frame member and with the first threaded securement element; and a second threaded securement element is engaged with the first threaded securement element via the apertures in the second transverse frame member and the upright frame member to secure together the first and second transverse frame members and the upright frame member.

As will readily be evident, the relative location of the first and second transverse frame members and the upright frame member and their securement together is not a difficult operation and can generally be performed by non-specialist labour.

Preferably, the first and second transverse members are channel members, the location piece fits within the first transverse frame member and extends therefrom axially of the second transverse frame member, and the second transverse frame member fits over the location piece. This strengthens and rigidifies the junction. The location piece may itself comprise a channel member.

The upright frame member may be a channel member having said at least two spaced openings and said aperture in its base web. In this case, a clamping plate provided with an aperture in alignment with the aperture in the upright frame member may fit inside the upright channel member to enhance the security of the junction. The clamping plate may, if desired, be fixed to the upright frame member, for example by welding.

The said position may be a corner of the frame structure. Preferably, a similar arrangement is provided at each such corner. The position may, however, be displaced from a corner of the structure.

The first threaded securement element may be a female threaded element, which is preferably fixed to the location piece, in which case the second threaded securement element may be a male threaded element such as a screw or bolt. However, a converse arrangement could be employed. That is to say, the first threaded securement element could be a male threaded element such as a threaded stud fixed to the location piece or a screw or bolt passed through an aperture in the location piece and the apertures in the second transverse frame member and upright frame member to engage the second threaded securement element, which may be a female threaded element such as a nut.

The protrusions may, for example, be in the form of tongues or studs. They may be spaced apart vertically or horizontally or at an angle inclined to both the vertical and horizontal.

The invention will now be further described, by way of illustrative and non-limiting example, with reference to the accompanying drawings, in which:

FIG. 7 is a view, corresponding to FIG. 1, of a third embodiment of the invention;

FIG. 8 is an end view of a location piece shown in FIG. 7, as viewed from the right in FIG. 7; and FIGS. 9 and 10 are views, corresponding to FIGS. 2 and 3, respectively, of the third embodiment of the invention.

Figure 1:
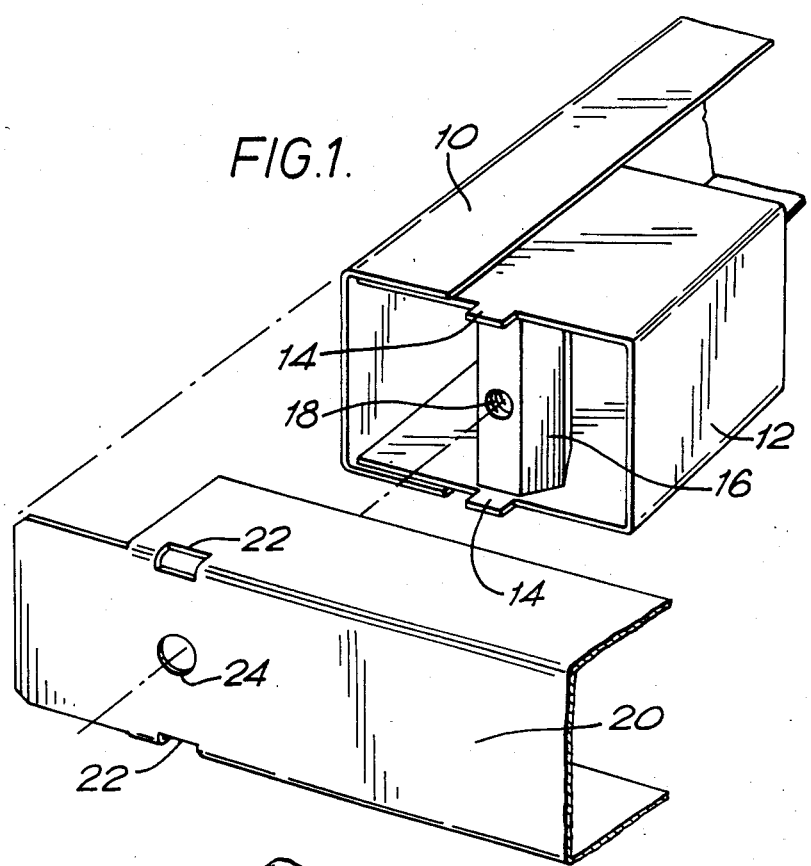
FIG. 1 is a exploded perspective view of part of a first frame structure embodying the invention, showing a first transverse frame member having a location fitted within an end thereof and a second transverse frame member positioned to be located with respect to the first transverse frame member and location piece.
Figure 2:
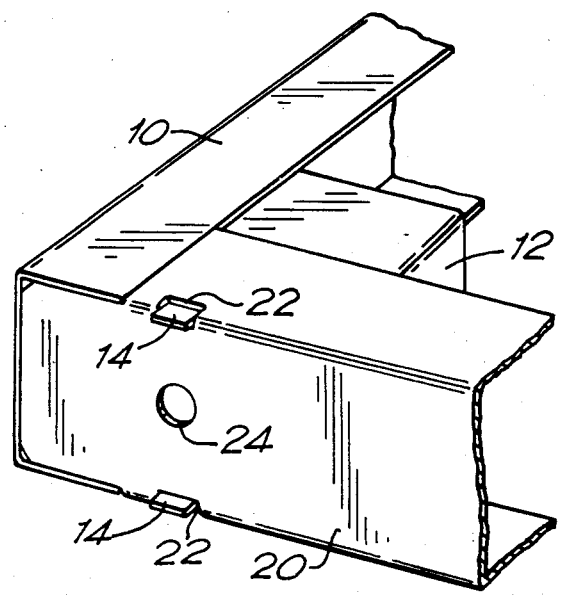
FIG. 2 is an perspective view, similar to FIG. 1, showing the second transverse frame member located with respect to the first transverse frame member and location piece.
Figure 3:
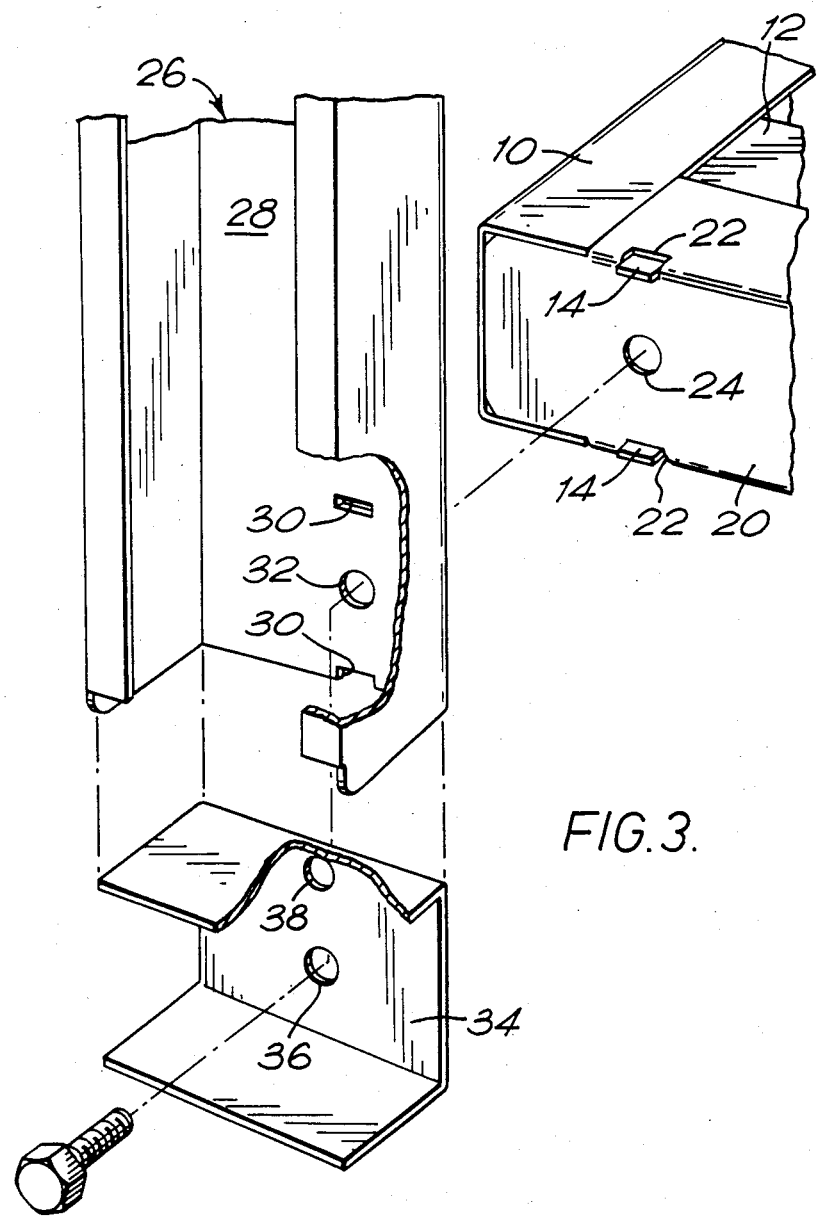
FIG. 3 is an exploded perspective view showing an upright frame member and a clamping plate positioned for location with respect to the construction shown in FIG. 2.

A first frame structure embodying the invention will be described with reference to FIGS. 1 to 3 of the accompanying drawings. The structure may, for example, comprise top and bottom transverse frame members, top and bottom rear transverse frame members, a pair of side transverse frame members at the top, a pair of side transverse frame members at the bottom, and four upright frame members, the members all being joined together at the eight corners of the structure in like manner. FIGS. 1 to 3 show how the junction is effected at one of the front, bottom corners.

Referring first to FIG. 1, this shows a front transverse or horizontal frame member 10 in the form of a channel member. A location piece 12, also a channel member, is fixed (e.g. by spot welding) within one end of the member 10. A pair of spaced protrusions or projections in the form of tongues 14 are formed where shown on the location piece 12 so as to extend therefrom substantially axially of the member 10. A hexagonal pillar 16 is fixed between the upper and lower webs of the location piece 12, for example by screws or bolts (not shown) extending through holes in the web into tapped holes in the ends of the pillar. A threaded or tapped hole 18, extending axially of the member 10, is formed where shown in the pillar 16.

A side transverse or horizontal frame member 20, also a channel member, has therein a pair of spaced openings 22 and an aperture 24. The side member 20 is located with respect to the front frame member 10 by moving it from the position shown in FIG. 1 to the position shown in FIG. 2. In the position shown in FIG. 2, the tongues 14 fit within the openings 22 to locate the side member 20 with respect to the front member 10. In this position, the location piece 12 fits within the side member 20 thereby enhancing the strength and security of the corner junction. Also, the aperture 24 in the side member 20 is aligned with the tapped hole 18 in the pillar 16 of the location piece 12.

FIG. 3 shows an upright frame member 26, also in the form of a channel member. At its bottom end, the base web 28 of the upright frame member 26 is provided with a pair of spaced openings 30, the upper one of which is in the form of a slot and the lower one of which is in the form of a recess in the lower end edge of the base web. Also, the base web is provided with an aperture 32. The upright frame member 26 is located with respect to the transverse or horizontal frame members 10, 12 by moving it towards them, as shown in FIG. 3, until the tongues 14 are located in the openings 30. In this position, the aperture 32 in the base web 28 of the upright frame member is aligned with the aperture 24 in the side transverse frame member 20 and with the tapped hole 18 in the pillar 16 of the location piece 12. The three frame members 10, 20 and 26 then being correctly and securely interlocated, they can be secured together by passing a screw or bolt (not shown) from within the upright frame member 26, through the apertures 32 and 24 and into the tapped hole 18 in the pillar 16 in the location piece 12. Preferably, a clamping plate 34 is used to enhance the strength of the junction. The clamping plate 34, which also is in the form of a channel member, is dimensioned to slide within the upright frame member 26 and has an aperture 36 which is aligned with the aperture 32. The bolt or screw is then passed through the aperture 36, as well as the apertures 32 and 24, into the tapped hole 18. In order not to foul the upper one of the tongues 14 where it protrudes through the upper one of the openings 30, the clamping plate 34 is provided with a clearance hole 38. No similar clearance hole is required for the lower one of the tongues 14 since that lower tongue is disposed below the clamping plate 34.

Figure 4:
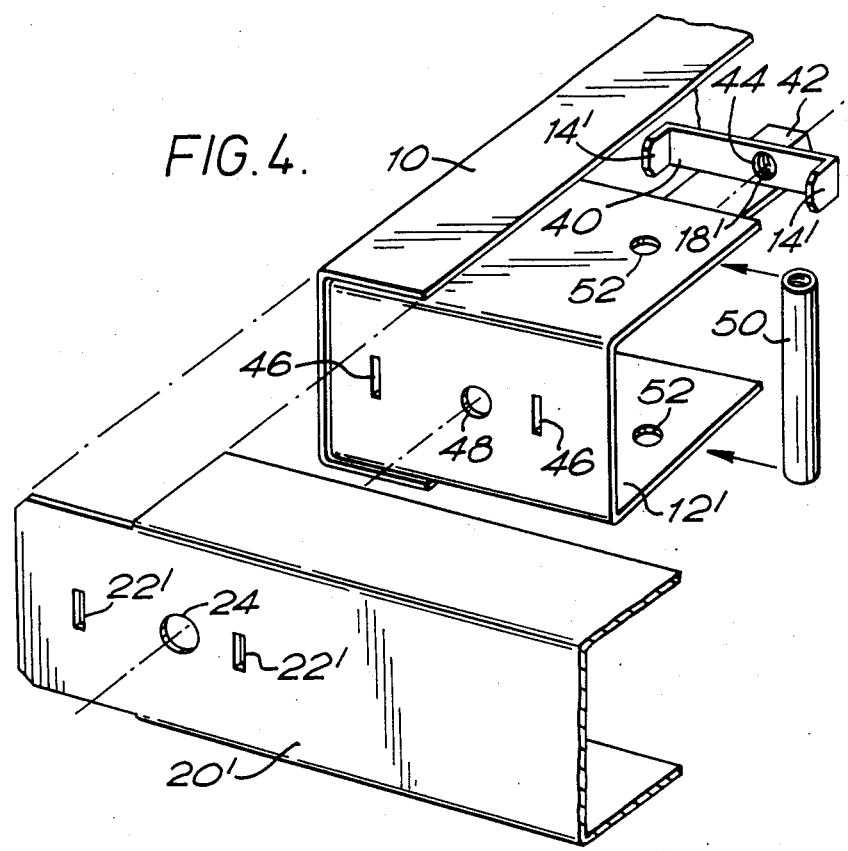
FIGS. 4 to 6 are views, corresponding to FIGS. 1 to 3, respectively, of a second embodiment of the invention.
Figure 5:
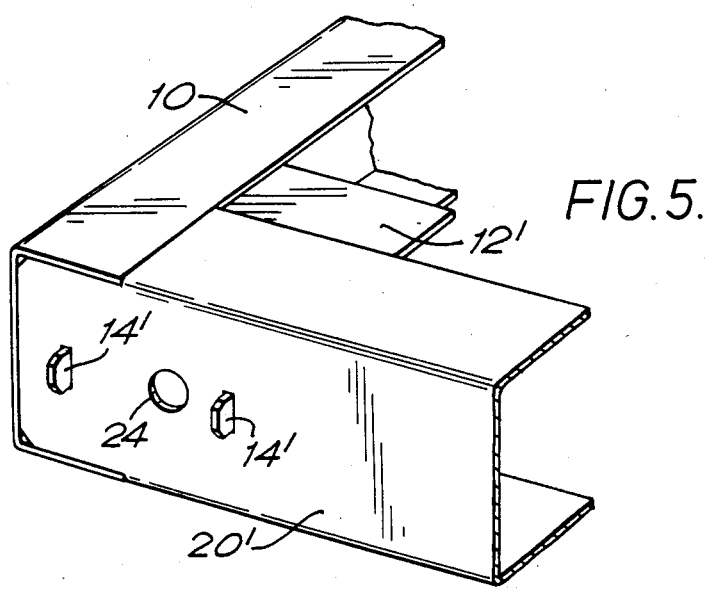
Figure 6:
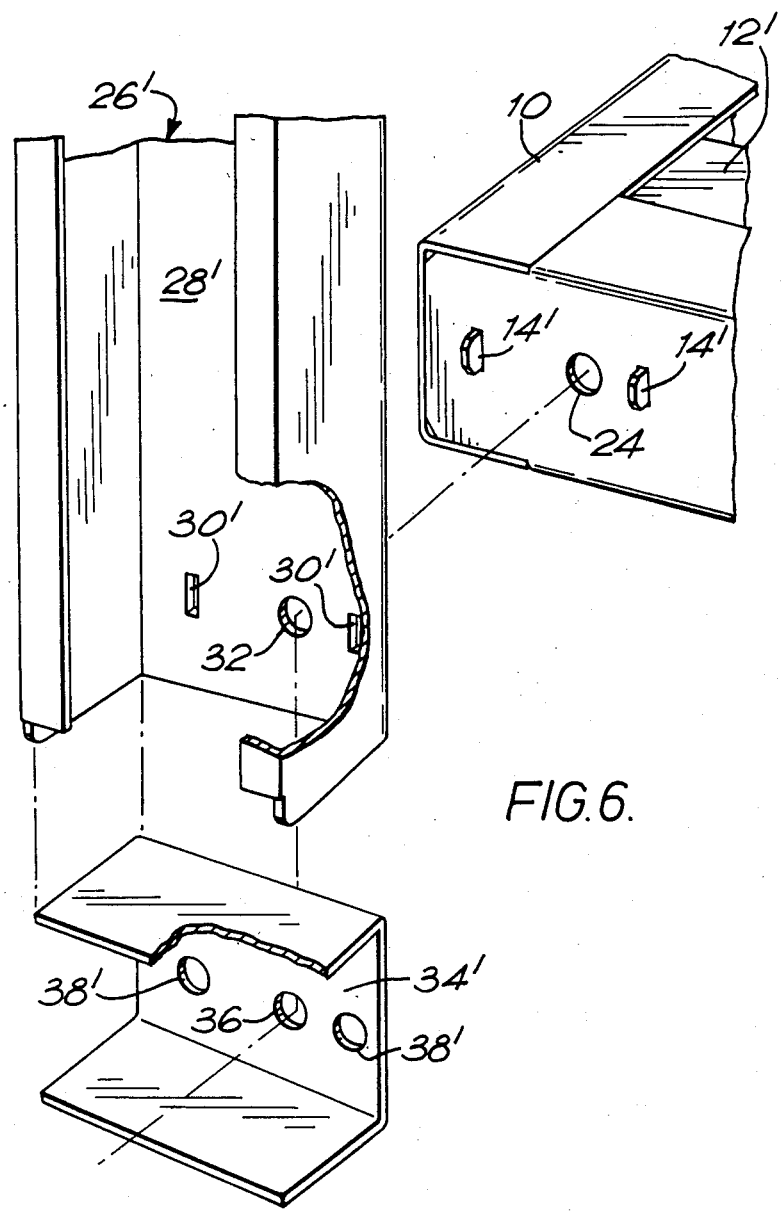

A second embodiment of the invention will now be described with reference to FIGS. 4 to 6, which correspond, respectively, to FIGS. 1 to 3 illustrating the first embodiment. The second embodiment is in many respects similar to the first embodiment and will be described only in so far as it differs therefrom. In FIGS. 4 to 6, items substantially identical to items shown in FIGS. 1 to 3 are designated by the same references, whereas items which are similar to but somewhat different from corresponding items in FIGS. 1 to 3 are designated by the same references with prime superscripts.

In the second embodiment, referring now to FIG. 4, the tongues 14' comprise bent portions formed at opposite ends of a strap 40. The threaded or tapped hole 18' is that of a nut 42 which is welded to the strap 40 so that the tapped hole 18' is aligned with an aperture 44 in the strap. The strap 40, which forms part of the location piece 12', is positioned with respect to the channel member of the location piece such that the tongues 14' protrude outwardly through openings in the form of slots 46, in which position the aperture 44 and tapped hole 18' are aligned with the aperture 48. The strap 40 could, if desired, be fixed to the channel member of the location piece 12', but this is not necessary.

A pillar 50, threaded at each end, is fitted within the channel member of the location piece 12' by means of screws or bolts (not shown) passed through holes 52 in the upper and lower webs thereof. The pillar 50 thus strengthens the location piece 12. Also, it enables accessories, for example castors or eye bolts, to be fitted to the frame structure, in which case the castor or eye bolt or the like would be threaded into the hole at that end of the pillar 50 on the outside of the frame structure. (In this connection, it is to be noted an accessory could be similarly fitted to the first embodiment by screwing it into a hole in the end of the pillar 16 on the outside of the frame structure).

It will be seen that the second embodiment, as so far described, is similar to the first embodiment. The principal difference is that the tongues 14' are spaced horizontally, rather than being spaced vertically as are the tongues 14. The use of tongues 14' provided on a strap is believed to enhance the strength of the junction or joint against twisting, as compared to that of the first embodiment.

Assembly of the joint is then completed in a similar manner to the first embodiment. That is to say, the side frame member 20', which has openings 22' therein, is fitted to the location piece 12, to form the construction shown in FIG. 5, the upright frame member 26' is then located therewith by fitting openings 30' therein over the tongues 14', the clamping plate 34' is then positioned, clearance holes 38' therein preventing its fouling the free ends of the tongues 14', and a screw or bolt is then passed through the apertures 36, 32, 24, 48 and 44 into the threaded or tapped hole 18' to secure the corner together.

A third embodiment of the invention will now be described with reference to FIGS. 7 to 10, of which FIGS. 7, 9 and 10 correspond, respectively, to FIGS. 1 to 3 illustrating the first embodiment and FIGS. 4 to 6 illustrating the second embodiment. The third embodiment is in many respects similar to the first and second embodiments and will be described only in so far as it differs therefrom. In FIGS. 7 to 10, substantially identical to items shown in FIGS. 1 to 6 are designated by the same references, whereas items which are similar to but somewhat different from corresponding items in FIGS. 1 to 6 are designated by the same references with double prime superscripts.

In the third embodiment, the protrusions are constituted by studs 14" (rather than tongues 14 or 14') which are formed by shank portions of rivetlike members 60 (FIG. 8) which are pushed through holes in the location piece 12" from the inside of the location piece and whose heads 62 are thereafter welded to the location piece to hold them in place. The use of studs 14", as opposed to tongues, has been found to enhance the rigidity of the structure. Rigidity may also be enhanced by the fact that, in this embodiment, the protrusions (studs) 14" are spaced in a direction which is inclined to the axes of both the horizontal frame member 10 and the horizontal frame member 20", rather than in a vertical direction (FIGS. 1 to 3) or a horizontal direction (FIGS. 4 to 6).

The studs 14" are shown most clearly in FIG. 8. As can be seen, they have tapered free end portions to assist in their engagement with the openings 22" in the horizontal frame member 20" and the openings 30" in the upright member 26". Also, as can be seen from FIG. 8, the studs 14" are provided with splines 64, which are provided to displace any paint which may have accumulated in the openings 22" and 30" if the frame members 20" and 26" have been painted prior to assembly of the structure.

A nut 42" is welded to the interior of the location piece 12" in alignment with the aperture 48. In like manner to the preceding embodiments, the structure is assembled by passing a screw or bolt through the apertures 36, 32 and 48 and screwing it into the nut 42".

As will be appreciated, a frame structure of any of the kinds described above can be assembled with ease by relatively unskilled personnel. This is of particular value where, for example, the rack is erected on the premises of, for example, an electronics company having little or no specialist mechanical manufacturing capability. The user would hold a stock of the various frame members supplied by a specialist manufacturer. To erect a frame structure, the user just withdraws from store the various frame members (the members 10 already having the location pieces 12, 12' or 12" welded thereto), clamping plates 34, 34' or 34" (if provided) and screws or bolts. The user may well in fact hold different supplies of frame members of different lengths to enable the erection of frame structures of different sizes.

A cabinet may be formed from the frame structure by fitting panels thereto. Also, various members for supporting racks may be fitted to the frame structure.

The invention can, of course, be performed in other ways than those described above by way of example. For instance, junctions similar to those described above could be formed at other positions than the corners of a frame structure. For instance, a large or a reinforced frame structure could be formed by using additional upright members spaced between the front and back upright members or by using additional side frame members spaced between the top and bottom side frame members. Further, it is conceivable that in some applications it might be sufficient to provide a single pair of upright frame members spaced between the front and back of the frame structure, in which case only four junctions as described above would be formed, none of which would be at corners of the frame structure.

Also the clamping plates 34, 34' or 34" may be spot-welded to the upright frame members 26, 26' or 26", in which case upright frame members with pre-fitted clamp members may be supplied by the manufacturer to the user. To simplify the welding operation, the clamping plates 34, 34' or 34" may be re-designed so that the channels therein extend vertically (i.e. in the same direction as the channels of the upright frame members 26, 26' or 26") rather than horizontally, as shown in the drawings.

What is claimed is:

1. A frame structure comprising:
   a first transverse frame member;
   a location piece fitted to one end of said first transverse frame member, said location piece having at least two spaced protrusions extending therefrom substantially axially of said first transverse frame member, and said location piece also having a first threaded securement element;
   a second transverse frame member having at least two spaced openings fitted over said protrusions to locate said second transverse frame member with respect to said first transverse frame member, said second transverse frame member also having an aperture which is aligned with said first threaded securement element;
   an upright frame member having at least two spaced openings fitted over said protrusions to locate said upright frame member with respect to said first and second transverse frame members, said upright frame member also having an aperture which is aligned with the aperture of said second transverse frame member and with said first threaded securement element; and
   a second threaded securement element engaged with said first threaded securement element via the apertures in said second transverse frame member and said upright frame member to secure together said first and second transverse frame members and said upright frame member.

2. A frame structure according to claim 1, wherein said upright and transverse frame members are joined together at a corner of the frame structure.

3. A frame structure according to claim 1, wherein said first threaded securement element is a male threaded element and said second threaded securement element is a female threaded element.

4. A frame structure according to claim 1, wherein said protrusions are spaced apart vertically.

5. A frame structure according to claim 1, wherein said protrusions are spaced apart horizontally.

6. A frame structure according to claim 1, wherein said protrusions are spaced apart at an angle inclined to both the vertical and horizontal.

7. A frame structure according to claim 1, wherein said first and second transverse frame members are channel members, said location piece is fitted within said first transverse frame member and extends therefrom axially of said second transverse frame member, and said second transverse frame member is fitted over said location piece.

8. A frame structure according to claim 7, wherein said location piece comprises a channel member.

9. A frame structure according to claim 1, wherein said first threaded securement element is a female threaded element and said second threaded securement element is a male threaded element.

10. A frame structure according to claim 9, wherein said female threaded element is fixed to the location piece.

11. A frame structure according to claim 1, wherein said upright frame member is a channel member having said at least two spaced openings and said aperture in its base web.

12. A frame structure according to claim 11, wherein a clamping plate provided with an aperture in alignment with the aperture in said upright frame member fits inside said upright frame member.

13. A frame structure according to claim 12, wherein said clamping plate is fixed to said upright frame member.

* * * * *